United States Patent [19]

Ames

[11] Patent Number: 4,689,164

[45] Date of Patent: Aug. 25, 1987

[54] EUTECTOID SALT COMPOSITION FOR COOLNESS STORAGE

[75] Inventor: Douglas A. Ames, Huntington Beach, Calif.

[73] Assignee: Transphase Systems, Inc., Huntington Beach, Calif.

[21] Appl. No.: 890,970

[22] Filed: Jul. 29, 1986

Related U.S. Application Data

[63] Continuation of Ser. No. 661,391, Oct. 16, 1984, abandoned.

[51] Int. Cl.⁴ .............................................. C09K 5/06
[52] U.S. Cl. ..................................... 252/70; 126/400
[58] Field of Search ........................... 252/70; 126/400

[56] References Cited

U.S. PATENT DOCUMENTS

| | | | |
|---|---|---|---|
| 3,893,506 | 7/1975 | Laing | 126/444 |
| 3,986,969 | 10/1976 | Telkes | 126/400 |
| 4,294,078 | 10/1981 | MacCracken | 126/436 |

FOREIGN PATENT DOCUMENTS 56-147884  11/1981  Japan ..................................... 252/70

*Primary Examiner*—Robert A. Wax
*Attorney, Agent, or Firm*—Watson, Cole, Grindle & Watson

[57] ABSTRACT

A eutectoid salt hydrate composition (phase change material) utilized for the storage of thermal energy at a temperature less than 50° F., in which the optimal mole ratio of potassium chloride to sodium sulfate to ammonium chloride is 1:4:4.

9 Claims, No Drawings

EUTECTOID SALT COMPOSITION FOR COOLNESS STORAGE

This application is a continuation of application Ser. No. 661,391, filed Oct. 16, 1984, now abandoned.

BACKGROUND OF THE INVENTION

1. Field of the Invention

This application in general refers to the use of certain compositions, generally referred to as phase change materials (PCM's) which change their phase, generally between solid and liquid phases, and thereby store heat energy during such change. More particularly, it refers to such PCM's which have the effect of storing coolness, because they melt and freeze at a temperature below room temperature.

2. The Prior Art

It has long been recognized that the heat generated by solar energy during daytime hours can be stored by various means to provide heat during those times when the heat from the sun is insufficient to provide energy in requisite amounts. More recently, there has been an awareness of the need for storing not heat, but what might be perceived as coolness, i.e., heat energy at temperatures substantially lower than body temperature or room temperature. Perhaps the most simple example of such coolness storage is a block of ice that releases its coolness—actually, it takes up heat from the surrounding ambience—as it melts. The present invention is specifically concerned with the storage of coolness.

The use of coolness storage has become of increasing importance in residential, but most particularly in commercial applications. Almost irrespective of outside temperatures, it has become necessary to provide some means for dissipating heat in a commercial structure. Where a building houses a manufacturing operation, obviously there is heat generated due to the operation of the equipment. Even where the structure is an office building, there is heat generated by electric lights, by office or kitchen equipment, and simply by the presence of human beings. As a consequence, the storage of heat for use during cooler periods has not found widespread application, except for specialized uses such as in solar hot water heaters or in greenhouse applications, where the practical, economic effectiveness of such devices has yet to be proved.

Coolness storage has been attempted on a commercial scale, although successes have been few, and some failures notable. In practice, coolness storage has generally been limited to such storage utilizing chilled water or ice. Chilled water storage has the immediate and blatant limitation that chilling water at off-peak times and then utilizing it during peak hours when coolness is required, takes advantage only of the specific heat of the water, rather than its heat of fusion. As an example, since the heat of fusion of water is 80 calories per gram, utilizing only the specific heat of water would require a volume many times that which could be gained by utilizing the heat of fusion of water-to-ice storage. If the water used for its specific heat is to have the same volume as water in which coolness is stored by heat of fusion, it would have to fall 80° C. in order to store as much coolness. Consequently, the space occupied by chilled water storage is a major drawback in the practical application of that procedure to the storage of coolness.

There are other serious problems in using chilled water to store coolness in addition to the requirement of great volumes of water to be chilled. When a large volume of water has been chilled to the required temperature, say 48° F., for circulation throughout a building, the return flow of warmed water mixes with the chilled water, thereby raising the temperature of the chilled water to an unacceptable level. Thus, chilled water storage is not believed to be an acceptable means of coolness storage which will gain widespread acceptance.

Recognizing the infirmities of chilled water storage, ice storage has long been considered as a possible alternative. While the problem of space attendant in chilled water storage is not present with ice storage, other problems are immediate. The difference in densities between ice and water presents a problem. Freezing a container full of water will exert a pressure on the container, and if the container is made of metal, the corrosiveness of the water will become evident, particularly in the presence of oxygen. Further, in a retrofit application where the chiller normally used to cool the building is already in place, that chiller will not be able to produce temperatures low enough to form ice, e.g., about 28° F. Instead, the chiller unit must be modified, in effect to become a low-temperature refrigeration system. Yet the quantum of energy necessary to achieve temperatures of 28° F. are substantially greater than those necessary to chill water to 50° F., at about which temperature most commercial, chilled water, air conditioning systems operate. Because the energy usage is not a straight-line function of the temperature to be achieved, it is uneconomical to make ice, use it to chill water to 32° F., then blend that water with tap water to achieve a 50° F. mixture that will be suitable for use in cooling structures.

Still another problem of ice storage systems is the fact that are usually constructed above grade, where the requisite space is often simply not available. Thus, the problems inherent in coolness storage systems that utilize ice as the storage means have prevented widespread use of that type of system as well.

That type of coolness storage system which appears to hold the greatest promise for commercial utilization is one which is well known, but which has utterly failed to achieve the success for which it seemed imminently destined for the past several decades. That type of system is the use of salt hydrates and additives and modifiers thereto to form eutectoid compositions that have their freezing (and melting) point controlled to a predetermined value. Such eutectoid salt mixtures are generally known as phase change materials. They have primarily been used to store heat, but also have been known to store cooling capacity.

To a large extent the use of PCMs to store coolness may be traced to patents and publications of Dr. Maria Telkes, a pioneer still active in the field. As early as 1954, in U.S. Pat. No. 2,677,664, Dr. Telkes described the use of borax (sodium tetraborate decahydrate) as a nucleating agent to seed salt hydrates so that supercooling is avoided and crystallization will be commenced at the eutectic point. The use of borax as a nucleating agent for sodium sulfate decahydrate was specifically disclosed by Dr. Telkes.

More recently, in U.S. Pat. No. 3,986,969, Dr. Telkes referred to the problem of manufacturing a homogeneous mixture of sodium sulfate decahydrate with other ingredients to form a eutectoid composition. She reviewed many acknowledged thickening agents and proposed a specific clay as an improved thixotropic agent. In that patent Dr. Telkes also set forth some known salts used to form eutectic mixtures with sodium sulfate decahydrate and to control a less-than-room temperature melting point thereof.

According to Dr. Telkes, it would appear that in order to achieve a sodium sulfate-based eutectoid having a freezing point somewhat below 50° F., it is necessary to use ammonium chloride. In this manner, freezing points of about 47°–48° F. can be achieved. One difficulty with the use of ammonium chloride is that it is a relatively expensive compound compared to other salts that make up a eutectoid mixture, e.g., sodium sulfate, potassium chloride, etc. As a result, its use has deterred commercialization of PCM's as a coolness storage medium.

In a so-called Final Report entitled, Bulk Storage of PCM, dated December 1977 to June 1980, which report was prepared for the Department of Energy, Office of Solar Applications, by Calmac Mfg. Corp., a formulation was proposed to achieve a "plateau" at 45°–48° F. The eutectic disclosed in that report, which was based on work of Dr. Telkes, is essentially one wherein there is a molar ratio of potassium chloride to sodium sulfate to ammonium chloride of 1:4:8. While such a plateau, or range of solidification and melting points, is satisfactory for most PCM storage installations, it will be apparent that by using so much ammonium chloride, not only is the expense of the PCM substantially increased, but on a weight basis less storage capacity is being achieved. It has been determined that the heat of fusion of the 1:4:8 composition proposed by Dr. Telkes is about 38 BTU per pound of PCM. This heat of fusion, while certainly satisfactory, is one that is subject to definite improvement.

Another difficulty with the use of large amounts of ammonium chloride, in addition to the lowering of the heat of fusion of the PCM, is the expense, as mentioned. Because there is no known large-scale use of ammonium chloride, and because ammonium chloride is not generally a by-product of large-scale production of other chemicals, its price is such that its use in quantities proposed for eutectoid mixtures, i.e., in a mole ratio of 2:1 to Glauber's salt (sodium sulfate decahydrate) in order to obtain freezing points below 50° F., has made the obtaining of such freezing points not impossible, but economically undesirable. Economy of storage is vital to the acceptance of coolness storage systems employing PCM's, rather than simply the effectiveness of such systems. Exemplarily, even the most effective PCM will prove a failure in the marketplace if the payback period for its installation is ten years or more. Coolness storage through the use of PCM's has remained a laboratory curiosity for the past forty years rather than a commercial success not because of possible unreliability, but because it can cost so much that the period during which the investment can be recovered through time-of-use rates is just too long.

BRIEF DESCRIPTION OF THE INVENTION

In accordance with the present invention, it has been determined that, in a eutectoid mix based on sodium sulfate, ammonium chloride can be used in lesser quantities than those previously considered necessary. This is true when the eutectoid is comprised of potassium chloride as well. The resulting PCM will have a eutectoid or freezing point of 47°–48° F., which is desired if the eutectoid composition is to be used to store coolness from water generated by a conventional chiller in a retrofit application. The frozen PCM can then be used to chill line water, which thereafter is pumped throughout the building to be cooled. In this manner no changes need be made in an existing chiller system, nor need the temperature of the water chilled by the frozen eutectoid composition be blended or altered. Expressed otherwise, the present invention can be used to store coolness in a retrofit application without any significant alteration to the water cooling system already in use in the building.

Basically, it has been found that when potassium chloride is utilized in the eutectic mixture, the mole ratios of sodium sulfate decahydrate and ammonium chloride can be approximately 1:1, thereby not only substantially reducing the cost of the PCM and the subsequent payback period for its use, but increasing the heat of fusion of the PCM from about 38 to 42 BTU's per pound. The combination of these advantages in a mole ratio in the vicinity of one part potassium chloride to four parts sodium sulfate decahydrate to four parts ammonium chloride should be such as to bring PCM's from the laboratory into a practical, profitable industry, both for manufacturers of PCM's and for users who install PCM coolness storage systems to take advantage of time-of-use utility rates.

DETAILED DESCRIPTION OF THE INVENTION

In my invention, I contemplate that the range of mole ratios of Glauber's salt, or of sodium sulfate, to ammonium chloride will vary from about 3:4 to 6:4, with a ratio of 4:4 presently being viewed as an optimum. That same eutectoid composition will have a mole ratio of potassium chloride to Glauber's salt of about 1:5 to 1:2, with 1:4 being deemed optimal.

As presently utilized, the entire composition, with a mole ratio of one part potassium chloride to four parts sodium sulfate to four parts ammonium chloride, would also include water in an amount equal to about 10 times the quantity of sodium sulfate, a dispersant (such as that described in the aforementioned '969 Telkes patent, and in other literature) and preferably a nucleating agent such as borax. Other ingredients may also be present, but they have no direct relationship to the present invention. The methods of mixing the various components may vary, and the fact that the present invention involves a different ratio of salts does not appear to have an effect on the method of mixing the ingredients of the PCM. Such methods may, e.g., be that described in said aforementioned Telkes patent and in the Calmac publication, to which reference has been made hereinbefore.

The resultant PCM is of a structure that is not absolutely known. It is a eutectoid composition in which sodium sulfate decahydrate may or may not be formed, but in which some complex salt hydrate or mixtures thereof may melt and freeze. Consequently, while certain terms have been used in this specification, such terms define materials to the best of my present knowledge, and I do not thereby wish to be bound to any theoretical chemical formula but to the composition formed from the salts admixed, regardless of the ultimately determined structure of that composition.

While this invention has been described with respect to preferred embodiments thereof, it will be apparent that improvements, alterations and modifications can be made in compositions using the present invention without departing from the spirit thereof. All such changes are desired to be included within the purview of this invention, which is to be measured only by the scope, including equivalents, of the following, appended claims.

I claim:

1. A salt hydrate composition adapted for the storage of thermal energy through the use of a eutectoid of sodium sulfate, which composition accomplishes substantial energy storage at a temperature less than room temperature through the latent heat of fusion of the composition, comprising a functional quantity of sodium sulfate, potassium chloride in a mole ratio to said sodium sulfate of about 1:5 to 1:2, and ammonium chloride in a mole ratio to said sodium sulfate of about 3:4 to 6:4.

2. A salt hydrate composition as claimed in claim 1, in which the ratio of potassium chloride to sodium sulfate is about 1:5 to 1:4.

3. A salt hydrate composition as claimed in claim 1, in which the ratio of potassium chloride to sodium sulfate is about 1:4.

4. A salt hydrate composition as claimed in claim 1, in which the ratio of ammonium chloride to sodium sulfate is about 3:4 to 5:4.

5. A salt hydrate composition as claimed in claim 1, in which the mole ratio of ammonium chloride to sodium sulfate is about 1:1.

6. A salt hydrate composition as claimed in claim 3, in which the mole ratio of ammonium chloride to sodium sulfate is about 1:1.

7. A eutectoid salt hydrate composition adapted for the storage of thermal energy through the use of a eutectoid of sodium sulfate, which composition accomplishes substantial energy storage at a temperature less than 50° F. through the latent heat of fusion of the composition, comprising sodium sulfate in an amount sufficient to provide the requisite storage capacity in said salt hydrate composition, potassium chloride in a mole ratio to said sodium sulfate of about 1:5 to 1:4, and ammonium chloride in a mole ratio to said sodium sulfate of about 3:4 to 6:4.

8. A eutectoid salt hydrate composition adapted for the storage of thermal energy through the use of a eutectoid of sodium sulfate, which composition accomplishes substantial energy storage through the latent heat of fusion of the composition, comprising sodium sulfate in an amount sufficient to provide the requisite storage capacity of the resulting composition, potassium chloride in a mole ratio to said sodium sulfate of 1:5 to 1:2, and ammonium chloride in a mole ratio to said sodium sulfate of about 1:1.

9. A salt hydrate composition as claimed in claim 1, further including a thixotropic dispersing agent and a nucleating agent.

* * * * *